United States Patent
Schneider

(10) Patent No.: US 10,024,560 B2
(45) Date of Patent: Jul. 17, 2018

(54) AIR FLAP ARRANGEMENT WITH A SEPARATE STOP COMPONENT

(71) Applicant: Röchling Automotive SE & Co. KG, Mannheim (DE)

(72) Inventor: Jürgen Schneider, Worms (DE)

(73) Assignee: RÖCHLING AUTOMOTIVE SE & CO. KG, Mannheim (DE)

( * ) Notice: Subject to any disclaimer, the term of this patent is extended or adjusted under 35 U.S.C. 154(b) by 1134 days.

(21) Appl. No.: 14/249,900

(22) Filed: Apr. 10, 2014

(65) Prior Publication Data

US 2014/0308890 A1   Oct. 16, 2014

(30) Foreign Application Priority Data

Apr. 11, 2013   (DE) .................. 10 2013 206 410

(51) Int. Cl.
| | |
|---|---|
| *F24F 7/00* | (2006.01) |
| *B60H 1/00* | (2006.01) |
| *F24F 13/14* | (2006.01) |
| *B60K 11/08* | (2006.01) |

(52) U.S. Cl.
CPC ............ *F24F 7/00* (2013.01); *B60H 1/00857* (2013.01); *B60K 11/085* (2013.01); *F24F 13/1426* (2013.01); *Y02T 10/88* (2013.01)

(58) Field of Classification Search
CPC ......... F24F 7/00; B60H 1/00857; B60K 11/85
USPC ................................................. 454/335, 369
See application file for complete search history.

(56) References Cited

U.S. PATENT DOCUMENTS

2013/0149955 A1*  6/2013  Jackson ................... F24F 11/04
454/255

FOREIGN PATENT DOCUMENTS

| DE | 10018268 A1 | 10/2001 |
|---|---|---|
| DE | 102004036667 A1 | 3/2006 |
| DE | 102011082519 A1 | 3/2013 |
| EP | 0692397 A1 | 1/1996 |

(Continued)

OTHER PUBLICATIONS

Search Report dated Jan. 29, 2014, issued in corresponding German application 10 2013 206 410.1, 5 pages.

*Primary Examiner* — Helena Kosanovic
(74) *Attorney, Agent, or Firm* — Prince Lobel Tye LLP

(57) ABSTRACT

The present invention comprises an air flap arrangement (10) for a motor vehicle, comprising at least one air flap (16), an air flap carrier (12), on which the at least one air flap (16) is mounted rotatably about an air flap rotational axis (L), and a rotary drive (14), of which the torque-delivering drive shaft (32) is coupled to the at least one air flap (16) in a torque-transmitting manner, wherein a rotation angle limiting device is provided, which has a stop (38) secured to the air flap carrier and which has a counter-stop (28) that can be rotated with the at least one air flap (16), wherein the stop (38) and counter-stop (28), in a relative end position of the at least one air flap (16), are configured for contact engagement with one another, wherein the counter-stop (28) is configured on a counter-stop component (26) and an air flap face formation (20) is configured on an air flap component (18) configured separately from the counter-stop component (26), the counter-stop component (26) being formed of a material, which has a higher tensile strength than the material of the air flap component (18).

18 Claims, 5 Drawing Sheets

(56) References Cited

FOREIGN PATENT DOCUMENTS

Figure 1:
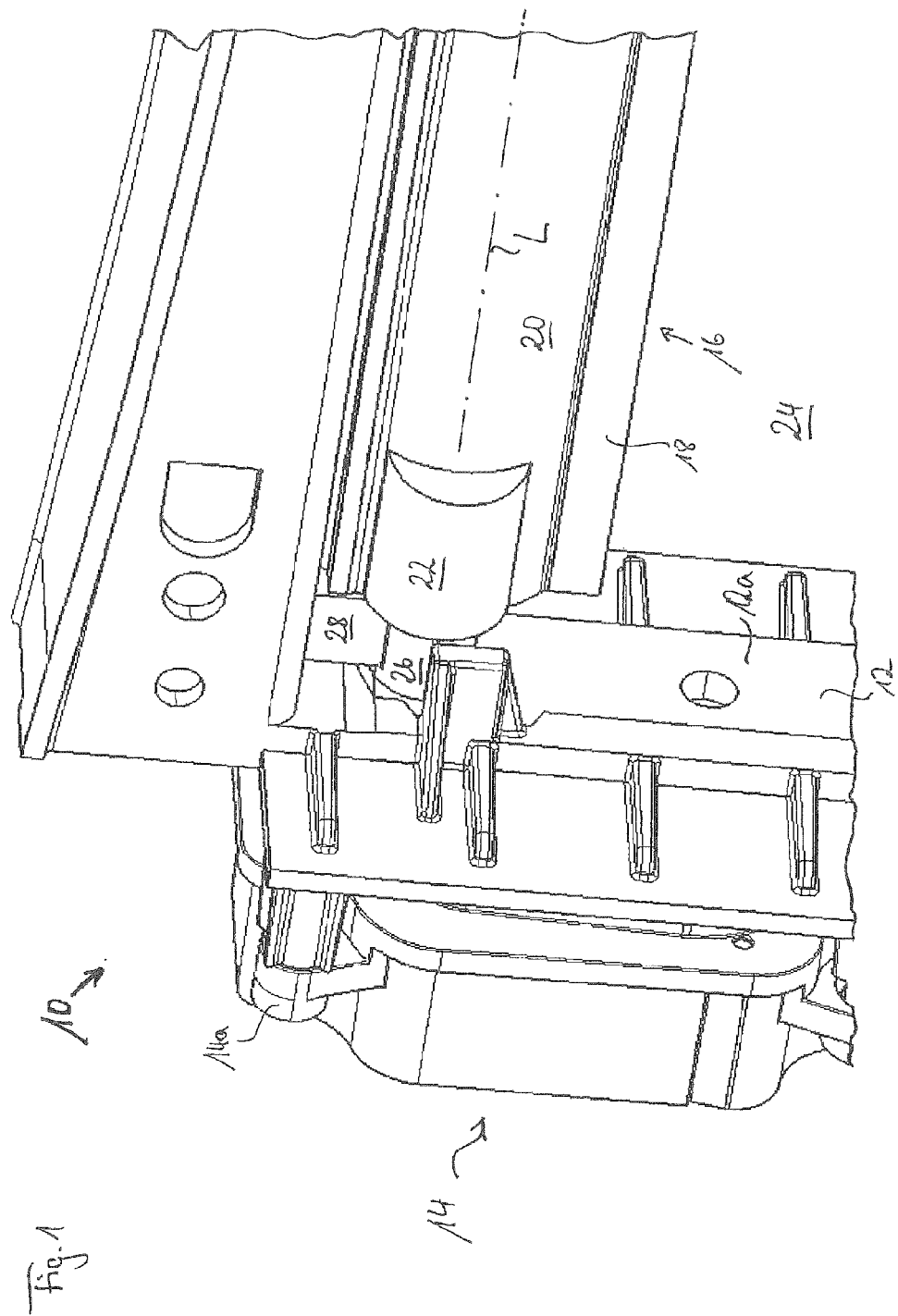

EP        2368731 A1    9/2011
FR        2764666 A1    12/1998

* cited by examiner

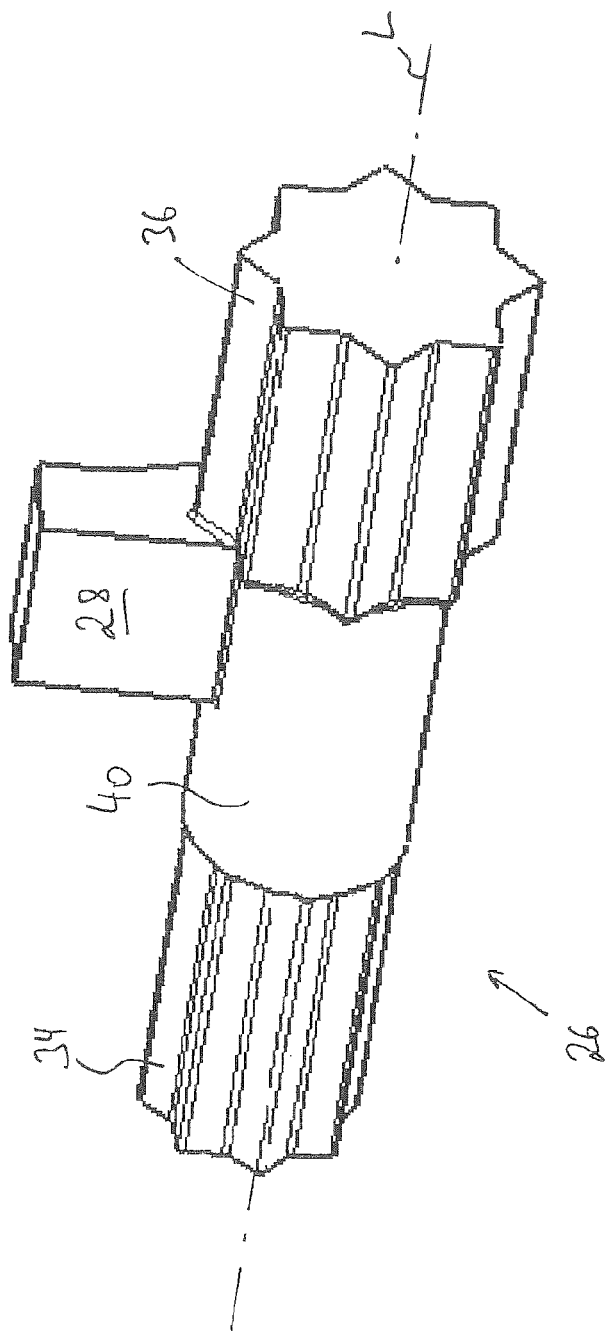

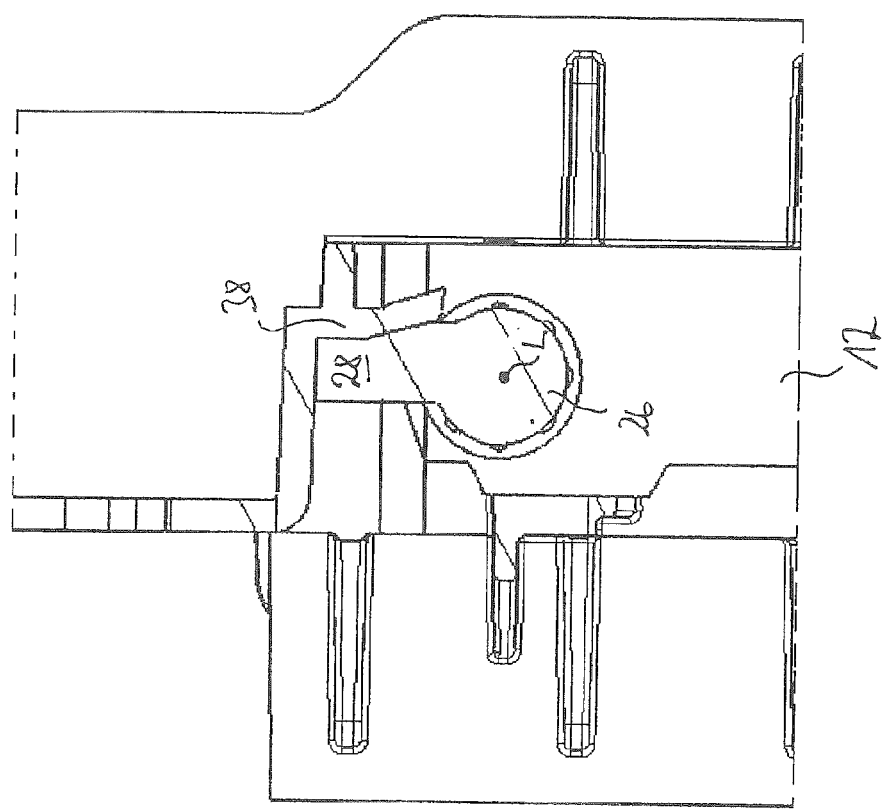

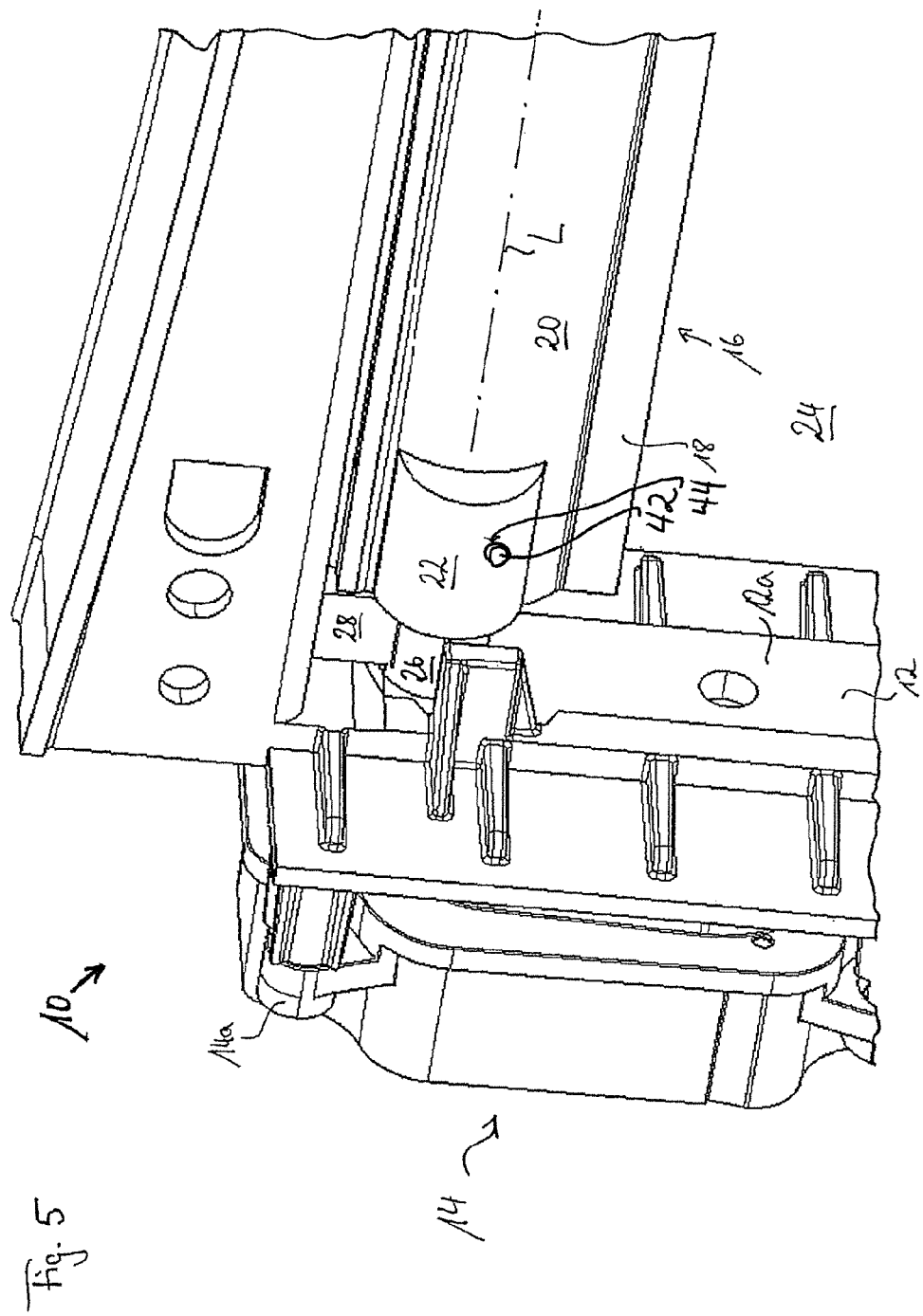

AIR FLAP ARRANGEMENT WITH A SEPARATE STOP COMPONENT

CROSS REFERENCE TO RELATED APPLICATION(S)

This application claims priority to German Application No. 10 2013 206 410.1, filed Apr. 11, 2013. The entirety of the disclosure of the above-referenced application is incorporated herein by reference.

The present invention relates to an air flap arrangement for a motor vehicle, comprising at least one air flap, an air flap carrier, on which the at least one air flap is mounted rotatably about an air flap rotational axis, and a rotary drive, of which the torque-delivering drive shaft is coupled to the at least one air flap in a torque-transmitting manner, wherein a rotation angle limiting device is provided, which has a stop secured to the air flap carrier and which has a counter-stop that can be rotated together with the at least one air flap, wherein the stop and counter-stop, in a relative end position of the at least one air flap relative to the air flap carrier, are configured for contact engagement with one another in such a way that when the contact engagement is produced, the at least one air flap can only still be moved in a rotational direction, which releases the contact engagement, relative to the air flap carrier, while a movement in a rotational direction opposing this release direction is not permitted.

Air flap arrangements of this type are in the meantime well known on motor vehicles in order to incline an air flap face formation to a different extent with respect to an air through-flow opening depending on its rotational position by rotating the air flaps about their air flap rotational axis and thus to change the effective cross-section of the air through-opening that is possible to be flowed through. This change can be effected up to a complete closure of the air through-opening by the at least one air flap.

Using air flap arrangements of this type, a cooling air flow through the air through-opening to units situated behind the air through-opening in the through-flow direction can be changed and adjusted to fit the cooling requirement. Thus, for example, after a cold start the cross-section of the air through-opening that is possible to be flowed through can be minimised by the at least one air flap to allow rapid heating of the units situated behind the air through-opening in the flow direction to their nominal operating temperature. Once this nominal operating temperature has been reached, by corresponding rotation of the at least one air flap relative to the carrier, the cross-sectional area that is effectively possible to be flowed through can be increased in order to keep the operating temperature of the relevant units within a narrow temperature band around the nominal operating temperature, depending on the operating state of the motor vehicle.

To provide a defined relative end position of the at least one air flap relative to the air flap carrier, the above-described rotation angle limiting device is provided, which, by means of a stop secured to the air flap carrier and a counter-stop that can be rotated together with the at least one air flap, only allows a rotation of the at least one air flap relative to the air flap carrier in a rotational direction until the contact engagement of the stop and counter-stop is achieved and, once the contact engagement is produced, only still allows a rotation in the opposite rotational direction, in other words in a release rotational direction to release the stop engagement.

Generally, for manufacturing and assembly reasons that are as favourable as possible, the air flaps are produced as one-piece components by injection moulding. These air flaps then comprise bearing formations configured in one piece, such as, for example, axial bearing extensions or protrusions and, axially between these bearing formations in each case, an air flap face formation, which performs the actual purpose of the air flap, namely to cover the air through-opening to a different extent depending on the rotational position of the air flap.

If, moreover, the statements "radial" and "axial" are used in the present application, this should always be understood in relation to the air flap rotational axis, unless another reference axis is expressly stated.

The rotary drives, which are becoming increasingly larger and which frequently threaten to mechanically overload the known rotation angle limiting devices constitute a technical problem. In any case, during relatively long operation, a counter-stop configured in one piece with the air flap can fail undesirably early, which damages the reputation of the component quality in an understandable manner.

It is therefore the object of the present invention to develop a generic air flap arrangement in such a way that rotary drives can also be used thereon, which supply a higher drive torque than currently used rotary drives, without reducing the operational lifetime of the air flap arrangement. In this case, in particular, manufacturing that is as economical as possible of the air flap arrangement should remain possible and the installation space required for the stop and counter-stop should not be increased. As the costs for producing the at least one air flap are decisively determined by the material used to produce it, the above object should above all be achieved with as great as possible maintaining the economical air flap material already used, which, moreover, can be managed well during the injection moulding processing for air flaps with a large area of extent and, in relation thereto, a comparatively small wall thickness.

According to the invention, this object is achieved by an air flap arrangement of the type mentioned at the outset, in which the counter-stop is formed on a counter-stop component and an air flap formation, which frees or covers an air through-opening to a different extent for through-flow during operation, depending on the relative position of the air flap relative to the air flap carrier, is formed on an air flap component configured separately from the counter-stop component, the counter-stop component being formed from a material, which has a higher tensile strength than the material of the air flap component.

By separating the at least one air flap into a counter-stop component and an air flap component configured separately therefrom, the air flap with the air flap face formation important for its purpose can still be made of the proven economical material, which could no longer have adequate strength for the forces transmitted at the contact engagement of the stop and counter-stop because of the torque of the rotary drive. Instead, by using a separate counter-stop component, which can therefore be formed from a different material with a higher tensile strength than the material of the air flap component, the forces occurring at the contact engagement can be transmitted without a corresponding increase in the installation space required for the stop and counter-stop.

The higher costs occurring owing to the material with a higher tensile strength compared with the proven material of the air flap component therefore apply to a component that has a small volume compared to the air flap component, so the cost increases to increase the strength are kept within limits.

Apart from the tensile strength, the exceeding of which means that the component is expected to break at the site where it is exceeded, a deformation of the components involved over time is also undesired as, for example by a deformation of the counter-stop, the relative end position of the at least one air flap relative to the carrier changes. As a result, maintaining the flow conditions linked as planned to the relative end position is therefore no longer ensured. An undesired deformation of the counter-stop and therefore an undesired displacement of the relative end position associated with the contact engagement can be prevented in that the material of the counter-stop component also has a higher modulus of elasticity than the material of the air flap component.

Basically, it is desired also to produce the counter-stop component by injection moulding. Therefore, the counter-stop component is preferably formed of plastics material. By filling the plastics material with tensile strength-increasing filling materials, such as, for example, glass fibres, glass spherules, carbon fibres and the like, the tensile strength of the material of the counter-stop component can be increased. Preferred materials for forming the counter-stop component, on the basis of their strength and resilience properties, are polyamide, polyester and polyoxymethylene. Amongst the polyamides, a material with the designation "PA66" is particularly preferred because of its strength properties. In the group of polyesters, polyethylene terephthalate has proven to be an excellently suitable material.

If a plurality of suitable materials are available, while mass-related costs are approximately the same, that material should be preferred for strength reasons, which has the lowest crystallisation tendency at higher temperatures of above +85° C.

In contrast to the counter-stop component, the air flap component can, as previously, be formed of a polyolefin, in particular of polypropylene. This plastics material exhibits an excellent processability for air flap components with a large length and comparatively large width compared to the component thickness. Moreover, polyolefins are particularly inexpensively available commercially. If the strength of the polyolefin is to be increased, the latter can also be filled with fillers, such as fibres or particles, in particular glass fibres, carbon fibres, glass spherules and the like. Thus, for example, the counter-stop component may be formed from PA66GF30 and the air flap component can be formed from the polypropylene PPGF30. The notation "GF30" indicates a proportion of glass fibres in the plastics material mass of 30%.

Advantageously, the counter-stop component can be used as a coupling component for the torque-transmitting coupling of the air flap component to the rotary drive. For this purpose, it may be envisaged that the counter-stop component has a first connection configuration for torque-transmitting connection to the drive shaft of the rotary drive and a second connection configuration for torque-transmitting connection to the air flap component. The first connection configuration can, in this case, simply be a central opening, for example a blind hole or a through-hole, into which a drive shaft of the rotary drive is inserted. Likewise, the first connection configuration may be a hub stump, which can be inserted in a recess of a drive shaft, which is configured as a hollow shaft, of the rotary drive. The latter configuration is preferred as the drive shaft of the rotary drive and the hub stump of the first connection configuration can be configured with a comparatively large diameter, which allows a transmission of a large torque, even with the plastics material components provided here.

Likewise, the second connection configuration can be configured as a shaft stump, which can be inserted into a hub surrounding the shaft stump on the air flap component. Alternatively, it is also possible to configure the second connection configuration as a hollow shaft stump, which can be plugged on an axially projecting hub stump of the air flap component. As the hub of the air flap component is preferably simultaneously used as a rotary bearing portion for rotatably mounting the air flap component at the longitudinal end having the hub configuration, insertion of a shaft stump of the second connection configuration into an air flap component-side hollow hub is preferred. The lateral surface of the hollow hub can then be used as a bearing face of the air flap component (bearing formation), with all the air flaps advantageously having the same bearing formation, the counter-formation of which can then be uniformly formed on the carrier.

The rotary drive, the counter-stop component and the air flap component can thus preferably be coupled to one another by simple axial plugging into or/and onto one another, the rotational axis of the drive shaft preferably being collinear with the air flap rotational axis of the air flap coupled to the rotary drive by means of the counter-stop component, in the completely assembled state.

In the preferred case of a counter-stop component with a first connection configuration axially projecting in one direction and with a second connection configuration projecting in the opposing axial direction, the counter-stop is preferably provided between the first and the second connection configuration. Thus, the counter-stop in the completely assembled state of the air flap arrangement can be provided close to the carrier, so that the stop secured to the carrier does not have to protrude unnecessarily far from the carrier, which is advantageous for its strength and dimensional stability.

As the stop and counter-stop can abruptly assume contact engagement, high forces can abruptly occur on the components involved: the stop and counter-stop. At a given predetermined torque, the forces are indirectly proportional to the load arm protruding from the air flap rotational axis. Thus, the larger the load arm, the smaller the force occurring between the stop and counter-stop. In order thus to keep the forces occurring in the contact engagement advantageously small, it may be envisaged that the counter-stop is provided radially further out than the first and the second connection configuration.

During operation, the air flap arrangement is subject to sometimes substantial temperature fluctuations, which inevitably leads to thermally caused dimensional changes at the components involved. In order to ensure that the torque-transmitting coupling engagement between the counter-stop component and air flap component is ensured despite the thermally caused dimensional changes, it may be provided that the air flap component is axially fixed to the counter-stop component. For repair and maintenance purposes, a releasable fixing is preferred, in which the components can be released from one another without destruction. An axial latching of the air flap component to the counter-stop component is advisable as a structurally simple solution, which also does not lead to additional effort during manufacture and assembly and which is easy to handle.

The first and the second connection configuration preferably have a profiling, such as, a spline shaft profile or a polyhedron profile, which allows a positive torque transmission with a correspondingly counter-profiled counter-component on the part of the rotary drive, on the one hand, and the air flap component, on the other hand.

For stable arrangement in view of the high dynamic forces sometimes occurring during conventional motor vehicle operation, it is preferred if the rotary drive is arranged on one side of a portion, for example a cheek or a wall, of the carrier and if the air flap component is arranged on a side of this portion opposing this side, the counter-stop component preferably passing through the portion of the carrier from one side to the other.

Figure 2:
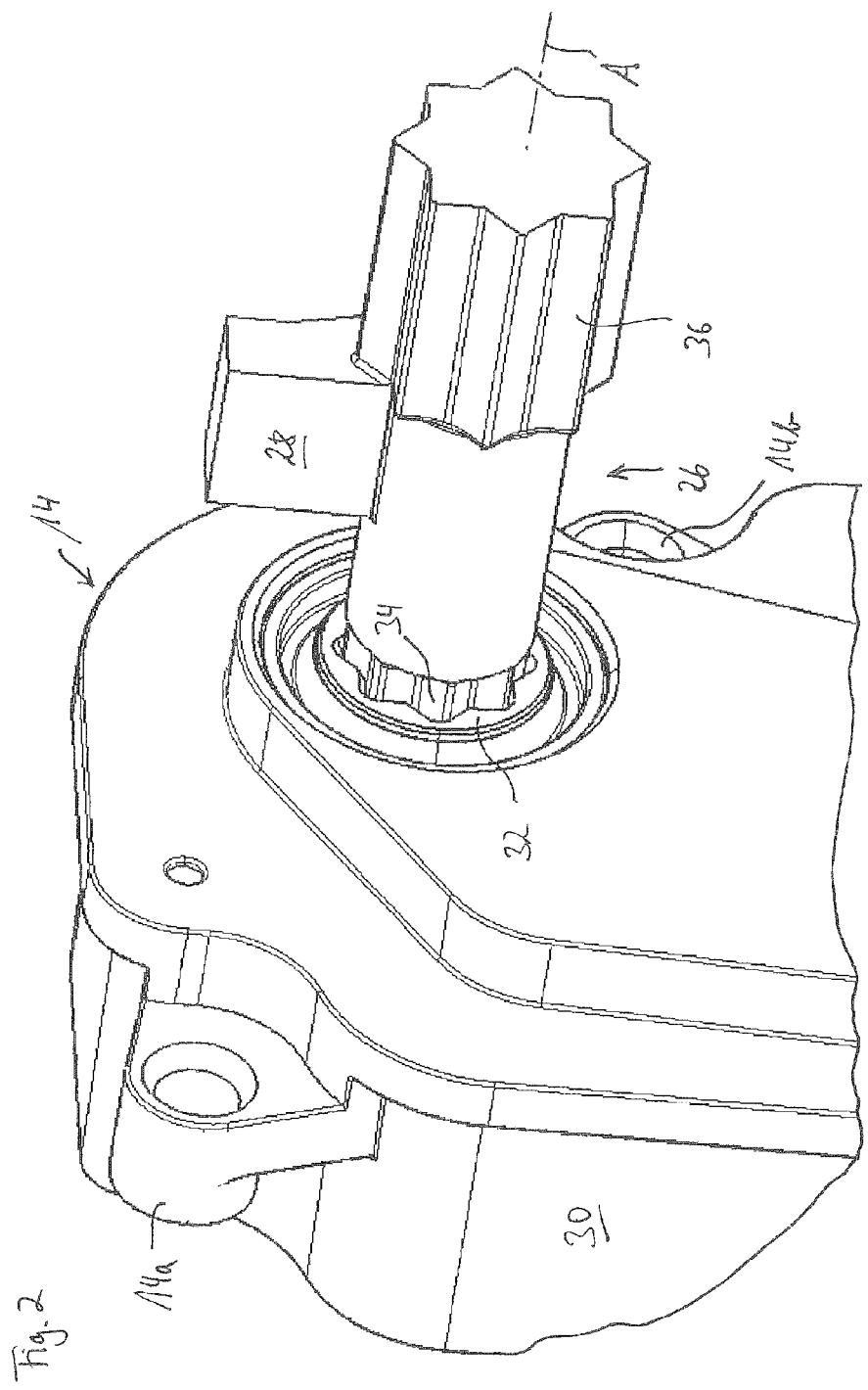

The present application will be described in more detail below with the aid of the accompanying drawings, in which:

FIG. 1 shows a perspective view of a relevant part of an embodiment according to the invention of an air flap arrangement, FIG. 2 shows the rotary drive and the counter-stop component of the air flap arrangement of FIG. 1 in a perspective view, FIG. 3 shows the counter-stop component of FIG. 2 in a perspective view, FIG. 4 shows a partial sectional view with a viewing direction along the air flap rotational axis in a sectional plane orthogonal thereto, with a section through the counter-stop of the counter-stop component, and FIG. 5 shows a perspective view of a relevant part of an embodiment according to the invention of an air flap arrangement.

FIG. 1 shows an embodiment according to the invention of an air flap arrangement designated in general by 10. This comprises a carrier 12, a rotary drive 14 and an air flap 16, which is rotatable about an air flap longitudinal axis L. The air flap 16 is rotatably received on the carrier 12.

The rotary drive 14 is preferably an electric motor rotary drive.

The air flap 16 has an air flap component 18, which may have a flat air flap face formation 20 and a longitudinal end-side bearing formation 22. The air flap face formation 20 is used for the actual purpose of the air flap 16, namely to change an effective through-cross-section of an air through-opening 24, in which the air flap 16 is usually arranged.

A counter-stop component 26, which has a counter-stop 28 for contact engagement with a carrier-side stop 38 that cannot be seen in FIG. 1, can be seen axially between the rotary drive 14 and the air flap 16 (see FIG. 4). In the embodiment of FIG. 1, the counter-stop 28 projects upwardly in the radial direction from the remaining counter-stop component 26.

The air flap 16, more precisely the air flap component 18, may be coupled by means of the counter-stop component 26 in a torque-transmitting manner to the rotary drive 14.

The rotary drive 14 is shown together with the counter-stop component 26 in FIG. 2. Fastening eyes 14a and 14b, with which the rotary drive 14, more precisely its housing 30, can be fastened to one side of the carrier 12, can be seen.

As can be seen in FIG. 2, the drive shaft 32 of the rotary drive 14 can be configured as a hollow shaft. A first connection configuration 34 of the counter-stop component 26 with, for example, a polyhedral peripheral shape can be inserted into the recess of the hollow shaft 32. The inner wall of the hollow shaft 32 is preferably formed correspondingly negatively with respect to the polyhedral peripheral shape of the first connection configuration 34, so that a torque about the drive shaft axis A can be positively transmitted from the drive shaft 32 to the first connection configuration 34.

A second connection configuration 36, which is configured for torque-transmitting coupling to the air flap component 18, can be configured on the longitudinal end of the counter-stop configuration 26 opposing the first connection configuration 34. The second connection configuration 36 can also have a polyhedral peripheral shape for positive torque transmission from the counter-stop component 26 to the air flap component 18. Instead of the profiles shown in FIG. 2, one or both connection configurations 34 and/or 36 can be configured as a spline shaft profile.

In a portion situated axially between the first connection configuration 34 and the second connection configuration 36 (passage portion 40), the counter-stop 28 is formed as a radial extension or protrusion.

In the completely assembled state, the drive axis A of the drive shaft 32 of the rotary drive 14 and the air flap longitudinal axis L of the air flap 16 or the air flap component 18 are preferably collinear.

The counter-stop component 26 is shown on its own in FIG. 3.

The counter-stop component 26 is preferably made of a plastics material, particularly preferably of a filled plastics material. The latter has a higher tensile strength than the material, preferably the plastics material, of the air flap component 18. The counter-stop component 26 is particularly preferably made of a polyamide "PA66GF30", in other words of polyamide 6.6 with a glass fibre content of 30%. This material does not only have a higher tensile strength than the material of the air flap component, but moreover has a higher modulus of elasticity than the material of the air flap component 18 in the operating temperature range to be expected. The counter-stop component 26 is configured in one piece, for example by injection moulding, for reasons of high strength simultaneously with simple production.

The air flap component 18 is preferably produced from PPGF30, in other words a polypropylene filled with 30% glass fibres. This material is more economical but does not have the necessary strengths for the forces and loads occurring at the counter-stop 28 with the predetermined stop geometry.

The air flap component 18 is preferably produced in one piece by an injection moulding method or by another casting method.

FIG. 4 shows a partial sectional view of the air flap arrangement 10 leaving out the air flap component 18.

It is seen there how the counter-stop 28 has a contact engagement on a stop 38 of the carrier 12. Owing to this contact arrangement, a further rotation of the counter-stop component 26 and, connected therewith, of the air flap component 18 about the air flap rotational axis L in FIG. 4 in the clockwise direction is prevented. The contact engagement thus defines a relative end position of the air flap component 18 relative to the carrier 12 and therefore relative to the air through-opening 24, as the counter-stop component 26 is preferably coupled to the air flap component 18 without play in the rotational direction about the air flap rotational axis L.

The stop 38 is preferably formed in one piece by injection moulding or by another casting method to the carrier 12. However, it is not ruled out that the stop 38 is assembled on the carrier 12 as a separate component. The stop 38 is secured to the carrier 12, i.e. cannot move relative to the carrier 12 except by deformation.

The counter-stop component 26, with a passage portion 40 (see FIG. 3), passes through a cheek 12a (see FIG. 1) of the carrier 12, on one side of which the rotary drive 14 can be provided and on the other side of which the air flap component 18 can be provided. Using the solution presented here, rotary drives 14 with very strong torque can be used on the air flap arrangement 10 without the stop 38 having to be made thicker or in some other way having a greater space requirement than in conventional solutions with a stop configured in one piece on the air flap component.

A possible axial fixing of the air flap component 18 on the second connection configuration 36 is shown in FIG. 5. A fixing of this type can preferably be configured as a latching (42, 44), for example in that a configuration of a second connection configuration 36 and bearing formation 22 has a latching projection projecting 42 radially toward the respective other configuration and the respective other portion has a corresponding recess 44.

The invention claimed is:

1. Air flap arrangement or a motor vehicle, comprising:
at least one air flap;
an air flap carrier on which the at least one air flap is mounted rotatably about an air flap rotational axis;
and a rotary drive, of which the torque-delivering drive shaft is coupled to the at least one air flap in a torque-transmitting manner, wherein a rotation angle limiting device is provided, which has a stop secured to the air flap carrier and which has a counter-stop that can be rotated together with the at least one air flap, wherein the stop and counter-stop, in a relative end position of the at least one air flap relative to the air flap carrier, are configured for contact engagement with one another in such a way that when the contact engagement is produced, the at least one air flap can only still be moved in a rotational direction, which releases the contact engagement, relative to the air flap carrier, while a movement in a rotational direction opposing this release direction is not permitted;
wherein the counter-stop is formed on a counter-stop component and an air flap face formation, which frees or covers an air through-opening to a different extent for through-flow during operation, depending on the relative position of the air flap relative to the air flap carrier, is formed on an air flap component configured separately from the counter-stop component, the counter-stop component being formed of a material, which has a higher tensile strength than the material of the air flap component, wherein the counter-stop component has a first connection configuration for torque-transmitting connection to the drive shaft of the rotary drive and a second connection configuration for torque-transmitting connection to the air flap component, wherein the counter-stop is provided radially further out than the first and the second connection configuration.

2. Air flap arrangement according to claim 1, wherein the material of the counter-stop component also has a higher modulus of elasticity than the material of the air flap component.

3. Air flap arrangement according to claim 1, wherein the counter-stop component is made of polyamide.

4. Air flap arrangement according to claim 1, wherein counter-stop component is formed of filled plastics material.

5. Air flap arrangement according to claim 1, wherein the air flap component is formed of polyolefin.

6. Air flap arrangement according to claim 1, wherein counter-stop is provided axially between the first and the second connection configuration.

7. Air flap arrangement according to claim 1, wherein the first connection configuration can be inserted into the drive shaft or can be plugged onto the same or/and in that the second connection configuration can be inserted into a bearing formation, a bearing extension, of the air flap component or can be plugged onto the same.

8. Air flap arrangement according to claim 1, wherein the air flap component is axially fixed on the counter-stop component.

9. Air flap arrangement according to claim 1, wherein the rotary drive is arranged on one side of a portion of the carrier, and in that the air flap component is arranged on a side of this portion opposite thereto, the counter-stop component passing through the portion from one side to the other.

10. Air flap arrangement according to claim 3, wherein the counter-stop component is made of PA66 polyester.

11. Air flap arrangement according to claim 3, wherein the counter-stop component is made of polyethylene terephthalate or polyoxymethylene.

12. Air flap arrangement according to claim 5, wherein the air flap component is fowled of polyolefin.

13. Air flap arrangement according to claim 5, wherein the air flap component is formed of filled polyolefin.

14. Air flap arrangement according to claim 8, wherein the air flap component is axially fixed on the counter-stop component.

15. Air flap arrangement according to claim 8, wherein the air flap component is releasably fixed.

16. Air flap arrangement according to claim 9, wherein the rotary drive is arranged on one side of a cheek or a wall of the carrier, and in that the air flap component is arranged on a side of this portion opposite thereto, the counter-stop component.

17. Air flap arrangement according to claim 9, wherein the rotary drive is arranged on one side of a cheek or a wall of the carrier, and in that the air flap component is arranged on a side of this portion opposite thereto, passing through the portion from one side to the other.

18. Air flap arrangement according to claim 15, wherein the air flap component is latched.

* * * * *